UNITED STATES PATENT OFFICE.

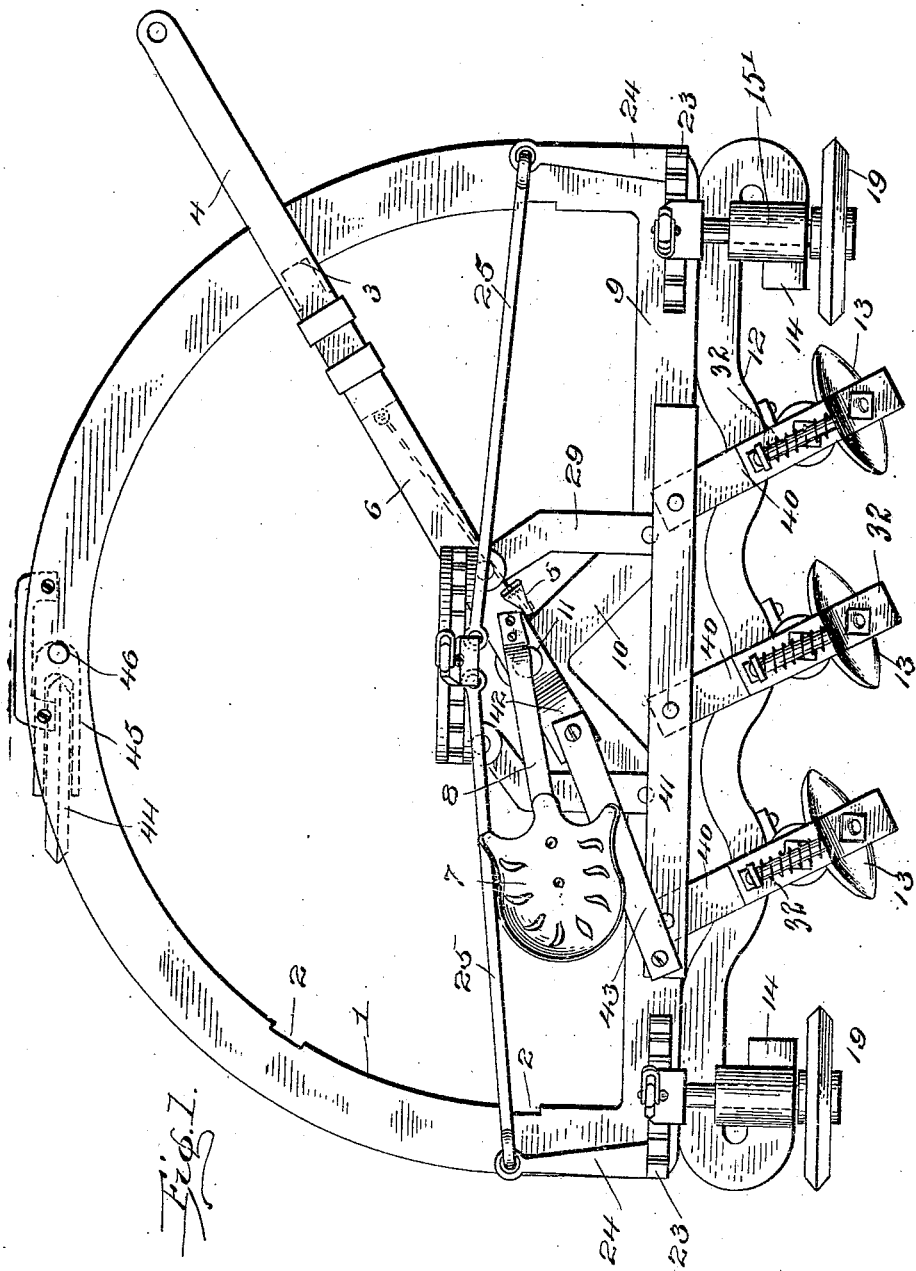

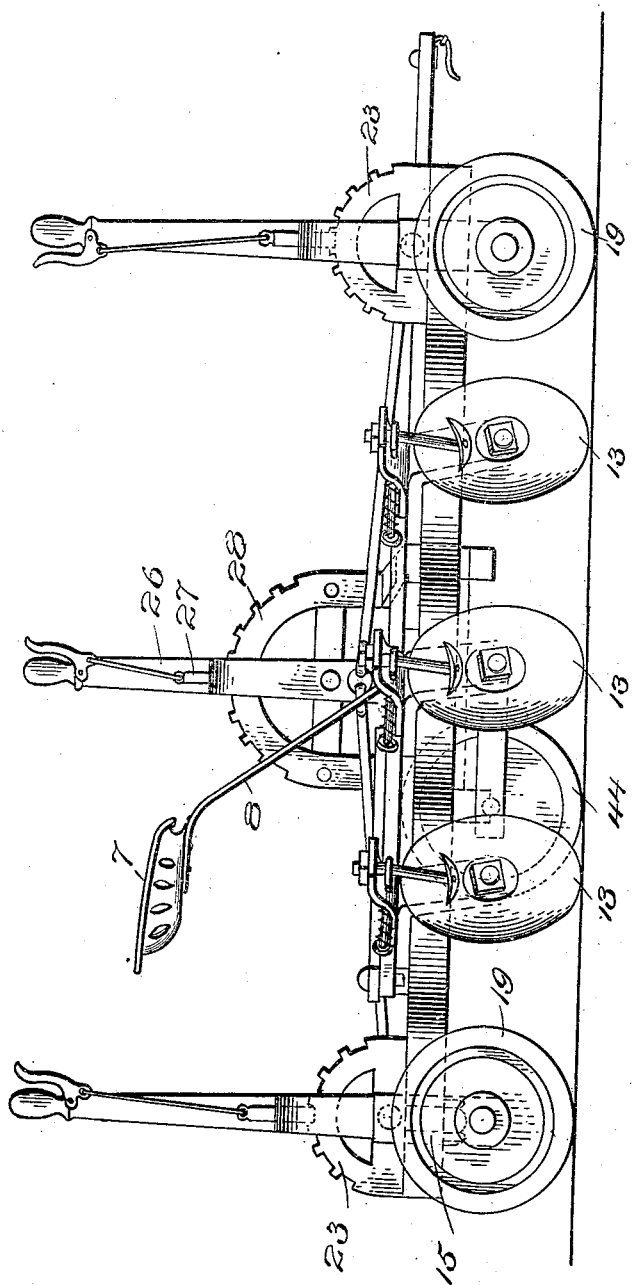

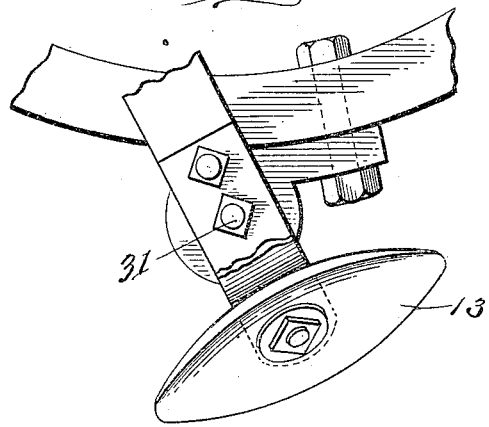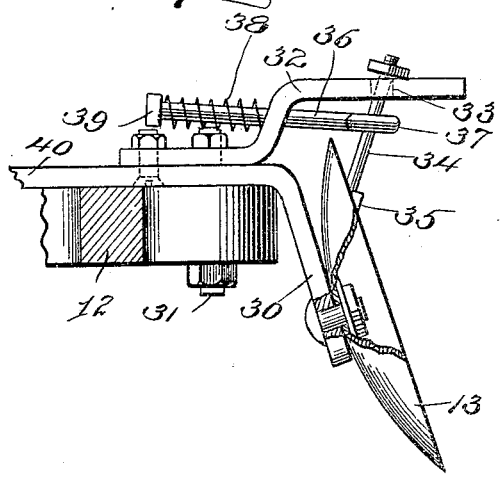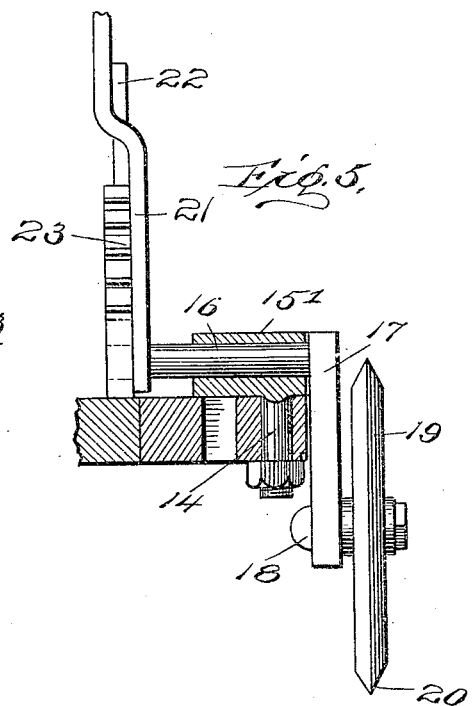

ELMER E. BRADFIELD, OF LIVERMORE, CALIFORNIA.

PLOW.

955,047.  Specification of Letters Patent.  Patented Apr. 12, 1910.

Application filed July 21, 1908. Serial No. 444,620.

*To all whom it may concern:*

Be it known that I, ELMER E. BRADFIELD, a citizen of the United States, residing at Livermore, in the county of Alameda and State of California, have invented new and useful Improvements in Plows, of which the following is a specification.

This invention relates to plows, the object of the invention being to provide a side-hill reversely disked gang plow by means of which it is unnecessary to turn the plow at each end of the field or furrow, the plow operating equally well in both directions and the disks and carrying wheels being so mounted as to be instantly reversed to suit the direction in which the plow, as a whole, is moving, the disks being automatically reversed by the draft animals at each end of the field.

With the above and other objects in view, the nature of which will more fully appear as the description proceeds, the invention consists in the novel construction, combination and arrangement of parts as herein fully described, illustrated and claimed.

In the accompanying drawings:—Figure 1 is a plan view of a plow embodying the present invention. Fig. 2 is a side elevation of the same. Fig. 3 is a detail broken plan view showing one of the disks and the manner of mounting the same on the frame of the plow. Fig. 4 is a broken edge elevation of one of the disks showing the manner of mounting the same on the plow frame. Fig. 5 is a detail vertical section showing the means for varying the height of the plow frame.

The plow frame is substantially semicircular as shown in Fig. 1, that is to say, it comprises a substantially circular or segmental combined rack and guide frame 1, which is provided along its inner edge with a plurality of notches 2 adapted to receive the adjacent end of a latch 3 which is mounted slidingly on the reverse draft beam or tongue 4 of the machine, the latch being operated by means of a foot trip 5 from which a rod or connection 6 extends to the latch as shown in Fig. 1, so that the driver still sitting in the seat 7 which is supported by a standard 8 extending upward from the draft beam or tongue, may, by placing his foot upon the trip move the rod 3 out of engagement with the rack 1 to allow the draft animals to swing around and reverse the tongue in a manner clearly apparent in Fig. 1. The frame also comprises a side bar 9 which connects the opposite extremities of the segmental rack bar 1 and which is inwardly bent opposite at an intermediate point as shown at 10 to receive the pivot 11 of the draft beam 4, as shown in Fig. 1. Extending along the side of the connecting bar 1 is a serpentine frame bar 12 which forms the supporting bars of the gang of the disks, the latter being indicated at 13 and the opposite ends of said bar 12 are recurved and extended toward each other as shown at 14 to form supports and bearings for vertical spindles 15 one of which is illustrated in dotted lines in Fig. 2 and in full lines in Fig. 5. On the upper end of each of said spindles 14 there is mounted a bearing 15' through which passes a short shaft or axle 16 the outer end of which has fast therein a downwardly extending crank arm 17 which carries a spindle 18 upon which is journaled one of the side carrying wheels 19, the latter being preferably provided with a reversely beveled tread which enables it to obtain the necessary hold on the soil and give the requisite deflection to the line of travel of the plow and prevent the same from sliding downward along a hillside. To the opposite end of the axle 16 there is connected a hand lever 21 provided with a thumb latch 22 which engages a rack segment 23 to hold the crank arm 17 at any desired angle according to the height to which the plow frame is to be adjusted.

Extending inward from each of the rack segments 23 is an arm 24 bearing a rigid relation to the rack and the said arms 24 which are located at the front and back of the machine are connected by rods 25 to a centrally arranged hand lever 26 provided with a thumb latch 27 engaging the rack segment 28 fast on an inwardly extending member 29 of the machine frame. The driver by moving the lever 26 in one direction or the other may correspondingly swing the carrying wheels 19 and also the racks 23 to give the desired angle to the carrying wheels without interfering with the lever arrangement for raising and lowering the plow frame.

By reference to Figs. 3 and 4, it will be observed that each of the disks 13 is mounted on an L-shaped hanger 30 which has a pivotal connection with the serpentine frame bar 12 by means of a bolt 31 or its equivalent. Connected to the horizontally extending portion of the hanger 30 is an upwardly extending bracket arm 32 having an opening 33 through which passes the stem 34 of a disk scraper 35 which bears against the concave side of the scraper and maintains the same in a clean condition. The scraper 35 is held in engagement with the disk by means of a tension device embodying a tension bolt 36 provided at its outer end with an eye through which the stem 34 passes. The bolt 36 passes through an opening in the bracket arm 32 where it has coiled around it a spring 38 confined between the bracket arm 32 and a tension adjusting nut 39 on said bolt as clearly shown in Fig. 4. The hangers 30 have the horizontal portions thereof extended inward to form operating arms 40, all of said arms being parallel to each other as shown in Fig. 1, and pivotally connected to an equalizing bar 41 which is operatively connected to a heel extension 42 of the draft beam or tongue 4 by means of a pivotal link or connecting rod 43 as clearly shown in Fig. 1, by reference to which it will be noted that when the draft beam or tongue 4 is swung around the segmental rack or frame bar 1 of the plow, the disks will at the same time be reversed or in other words move to a position in which they will have a reverse pitch. This enables the plow to be moved in either direction without being reversed except as regards the disks and the draft beam or tongue. After such reversal of parts has been effected, the driver, by operating the lever 26 may give a reverse pitch to the carrying wheels 19 to prevent the machine frame sheering off to one side while plowing on a side hill.

44 designates a trailer wheel or additional carrying wheel mounted in a fork 45 having the stem 46 thereof journaled in a bearing in a central portion of the bar 1 at the opposite side of the frame from the other carrying wheels 17.

I claim:—

A reversible plow embodying a frame including a bar extending substantially in the direction of movement of the plow and provided with a series of offsets, a series of hangers pivotally mounted on said offsets, disks journaled on said hangers, an equalizing bar connecting the hangers for simultaneous movement, a reversible draft beam having a pivotal connection with the plow frame, and a link interposed between said draft beam and equalizing bar.

In testimony whereof I affix my signature in presence of two witnesses.

ELMER E. BRADFIELD.

Witnesses:
 ELMER G. STILL,
 E. FITZ GERALD.